United States Patent
Kim et al.

(10) Patent No.: US 7,355,950 B2
(45) Date of Patent: *Apr. 8, 2008

(54) RECORDING AND/OR REPRODUCING APPARATUS, DISK MANUFACTURING APPARATUS, RECORDING AND/OR REPRODUCING METHOD, DISK MANUFACTURING METHOD, AND INFORMATION RECORDING MEDIUM USING RECORDING AND/OR REPRODUCING UNIT BLOCKS HAVING DIFFERENT SIZES IN DIFFERENT AREAS

(75) Inventors: Jin-han Kim, Suwon-si (KR);
Sung-hee Hwang, Seoul (KR);
Jae-seong Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 674 days.

This patent is subject to a terminal disclaimer.

(21) Appl. No.: 10/883,976

(22) Filed: Jul. 6, 2004

(65) Prior Publication Data
US 2005/0025010 A1    Feb. 3, 2005

(30) Foreign Application Priority Data
Jul. 8, 2003   (KR) .............. 10-2003-0046210
Jun. 9, 2004   (KR) .............. 10-2004-0042208

(51) Int. Cl.
*G11B 20/10*   (2006.01)
(52) U.S. Cl. ............... 369/59.26; 369/47.15
(58) Field of Classification Search ............... None
See application file for complete search history.

(56) References Cited

U.S. PATENT DOCUMENTS

2005/0031319 A1* 2/2005 Fujita et al. ............ 386/125
2005/0229082 A1* 10/2005 Kawamae et al. ....... 714/769

FOREIGN PATENT DOCUMENTS

| EP | 1 024 495 | 8/2000 |
|----|-----------|--------|
| JP | 2000-311353 | 11/2000 |
| JP | 3000-311353 | 11/2000 |
| JP | 2001-167445 | 6/2001 |
| JP | 2002-342941 | 11/2002 |
| KR | 2003-28353 | 4/2003 |
| WO | WO 02/073607 | 9/2002 |
| WO | WO 03/034414 | 4/2003 |

OTHER PUBLICATIONS

Office Action issued in Korean Patent Application No. 2004-42208 on Dec. 16, 2005.

* cited by examiner

*Primary Examiner*—Paul W. Huber
(74) *Attorney, Agent, or Firm*—Stein, McEwen & Bui, LLP

(57) ABSTRACT

A recording and/or reproducing apparatus including a signal processing unit that performs signal processing of a first and a second address to distinguish a first area disposed in a data recordable area of an information recording medium from a second area disposed in the data recordable area, the second area using a recording and/or reproducing unit block with a different size from that of a recording and/or reproducing unit block used in the first area, and records data on or reads data from the information recording medium; and a control unit that controls the signal processing unit for recording and/or reproducing data using the first address in the first area of the information recording medium and the second address in the second area.

56 Claims, 13 Drawing Sheets

FIG. 2D (PRIOR ART)

| | | | | |
|---|---|---|---|---|
| LAYER NO. BIT 2 | LAYER NO. BIT 1 | LAYER NO. BIT 0 | RUB NO. BIT 18 | ADDRESS PART |
| RUB NO. BIT 17 | RUB NO. BIT 16 | RUB NO. BIT 15 | RUB NO. BIT 14 | |
| RUB NO. BIT 13 | RUB NO. BIT 12 | RUB NO. BIT 11 | RUB NO. BIT 10 | |
| RUB NO. BIT 9 | RUB NO. BIT 8 | RUB NO. BIT 7 | RUB NO. BIT 6 | |
| RUB NO. BIT 5 | RUB NO. BIT 4 | RUB NO. BIT 3 | RUB NO. BIT 2 | |
| RUB NO. BIT 1 | RUB NO. BIT 0 | ADDRESS NO. BIT 1 | ADDRESS NO. BIT 0 | |
| RESERVE BIT 11 | RESERVE BIT 10 | RESERVE BIT 9 | RESERVE BIT 8 | RESERVATION PART |
| RESERVE BIT 7 | RESERVE BIT 6 | RESERVE BIT 5 | RESERVE BIT 4 | |
| RESERVE BIT 3 | RESERVE BIT 2 | RESERVE BIT 1 | RESERVE BIT 0 | |
| PARITY BIT 23 | PARITY BIT 22 | PARITY BIT 21 | PARITY BIT 20 | PARITY PART |
| PARITY BIT 19 | PARITY BIT 18 | PARITY BIT 17 | PARITY BIT 16 | |
| PARITY BIT 15 | PARITY BIT 14 | PARITY BIT 13 | PARITY BIT 12 | |
| PARITY BIT 11 | PARITY BIT 10 | PARITY BIT 9 | PARITY BIT 8 | |
| PARITY BIT 7 | PARITY BIT 6 | PARITY BIT 5 | PARITY BIT 4 | |
| PARITY BIT 3 | PARITY BIT 2 | PARITY BIT 1 | PARITY BIT 0 | |

RECORDING AND/OR REPRODUCING APPARATUS, DISK MANUFACTURING APPARATUS, RECORDING AND/OR REPRODUCING METHOD, DISK MANUFACTURING METHOD, AND INFORMATION RECORDING MEDIUM USING RECORDING AND/OR REPRODUCING UNIT BLOCKS HAVING DIFFERENT SIZES IN DIFFERENT AREAS

CROSS-REFERENCE TO RELATED APPLICATIONS

This application claims the benefit of Korean Patent Application Nos. 2003-46210 filed on Jul. 8, 2003, and 2004-42208 filed on Jun. 9, 2004, in the Korean Intellectual Property Office, the disclosures of which are incorporated herein by reference in their entirety.

BACKGROUND OF THE INVENTION

1. Field of the Invention

The invention relates to an information recording medium, and more particularly, to a recording and/or reproducing apparatus, a recording and/or reproducing method, a disk manufacturing apparatus and method, and/or an information recording medium.

2. Description of the Related Art

A channel bit length (CBL) of a digital versatile disk (DVD) is presently 0.133 μm. As the density of data storage in a DVD increases, the width and CBL of the DVD track decrease. As a result, the capability to correct an error decreases. The decrease in the error correction capability due to the decrease of the CBL can be compensated for by increasing the size of a recording and/or reproducing block, for example, by increasing the size from 32 KB to 64 KB. Thus, increasing the size of a recording and/or reproducing block to compensate for the decrease in the error correction capability is a preferable method for detecting errors in 80-mm or 120-mm disks. However, as the physical size of a recording medium continues to be reduced, a start radius, which is a start line for recording data, decreases, and accordingly, there exist some areas where the circumference of a data recording area is shorter than the length of a recording and/or reproducing block.

FIG. 1 is a diagram showing a scratch occurring in an overlapping area when the length of a recording and/or reproducing unit block or an error correction code (ECC) block exceeds one circumference according to a conventional method.

As shown in FIG. 1, when the circumference of an area where data are recorded is shorter than the length of a recording and/or reproducing unit block, the length of one block is longer than one circumference such that an overlapping area occurs, and if a scratch is made in this overlapping area, the error correction capability decreases, causing a reliability problem.

More specifically, on a disk-type recordable information recording medium, data is recorded along a track of the information recording medium, from an inner circumference to an outer circumference or from an outer circumference to an inner circumference. If the length of one recording and/or reproducing unit block or one error correction code (ECC) block is longer than a circumference with respect to a radius (or a diameter) of the information recording medium, an overlapping part of the recording and/or reproducing block or the ECC block in the radius direction occurs. Also, an error caused by dust, scratch, fingerprint, etc., usually affects many adjacent tracks. Accordingly, the effect of an error in the overlapping part is doubled in one ECC block and greatly reduces the reliability of the data.

FIG. 1 is a diagram showing a scratch occurring in an overlapping area. For example, as can be seen with reference to FIG. 1, when a 1 mm scratch is made in the overlapping area in the track direction, the practical effect to one ECC block is the same as when a 2 mm scratch occurs.

In case of a Reed-Solomon Product Code (RSPC) of a DVD, the code is formed with 416 sync frames, including 32 KB of user data, and one sync frame has 1488 channel bits. Referring to DVD specifications, details on this can be obtained. A detailed description of DVD specifications is readily and easily obtainable and will not be discussed herein.

Since the length of one channel bit is 0.133 μm, the length of one recording and/or reproducing block in the track direction is 416*1488*0.133 μm=82,328.064 μm.

Since 82,328.064 μm/3.14 equals approximately 26,219.129 μm, a circumference having a radius of less than approximately 13.1 mm is shorter than the length of the recording and/or reproducing unit block. Since the length of one sync frame=1488*0.133 μm=197.904 μm, a scratch of 1.6 mm affects about 8 continuous sync frames. In this case, an error of 4 bytes is caused in the Reed-Solomon (RS) (208,192,17) code in the length direction (case 1). When a scratch is made in the overlapping part, an error of 8 bytes, which is double the size of the error of case 1, is caused in the RS (208,192,17) code in the length direction (case 2).

Assuming that erase correction is performed for a location where a scratch occurs, when a byte error rate is 10−3, the error correction capability of the RS (208, 192, 17) code in the length direction is calculated by the following equation 1:

$$CER = 1 - \sum_{i=0}^{(16-e)/2} Q \binom{208-e}{i} E(1-p)^{208-e-i} Ep_i \quad (1)$$

Here, CER denotes a Codeword Error Rate, e denotes Erase number, and p denotes Byte Error Rate. When the CER is calculated for case 1 using the equation 1, since p=0.001 and e=4, the CER=2.2×10−9. When the CER for case 2 is calculated, since p=0.001 and e=8, the CER=2.2×10−6.

In case 2, when double errors by a random error, such as a small dust, occur in the overlapping location, the errors are not considered. Thus, the effect of a scratch in an overlapping part is critical to the reliability of data. Though the RSPC has an error correctible structure, the degradation of the error correction capability of the code cannot be ignored. In a DVD environment, the maximum error correction length of the RSPC is approximately 6 mm.

However, when recording and/or reproducing unit data is stored in an area longer than a circumference, for example, when data is recorded in a radius of 7 mm, one RSPC block exists along almost two tracks such that the maximum error correction length is reduced to 3 mm.

Thus, when a circumference of an area where a recording and/or reproducing unit block is recorded is shorter than the length of the recording and/or reproducing unit block, an overlapping area occurs and the error correction capability is substantially reduced such that the reliability of the data is reduced.

Examples of address data generated in an information recording medium are discussed below.

FIGS. 2A through 2D are diagrams explaining the address structure of an ADress In Pregroove (ADIP) which is recorded as a wobbling groove according to a conventional method.

FIG. 2A is a diagram showing an ADIP-recording unit block (RUB) data frame as an example of using ADIP address recorded as a wobbling groove. One recording unit block (RUB), that is, a recording cluster, is 498 frames. The recording unit of 498 frames is obtained by adding a run-in and a run-out for linking to 496 frames as the ECC block of data. As shown in FIG. 2A, 3 address blocks as ADIPs are included in an interval corresponding to one RUB. One address block is formed with 83 bits. An 83-bit address block includes an 8-bit sync part (a synchronization signal part) and a 75-bit data part.

In the 8-bit sync part, 4 units of sync blocks, each unit comprising a monotone bit (1 bit) and a sync bit (1 bit), are formed. In the 75-bit data part, 15 units of ADIP blocks, each unit comprising a monotone bit (1 bit) and ADIP bits (4 bits), are formed.

FIG. 2B is a diagram showing a detailed frame structure of a sync part of an address block (ADIP) of FIG. 2A.

An 8-bit sync part is formed with 4 sync blocks. Each sync block is 2 bits long.

Sync block "0" is formed with a monotone bit and sync "0" bit. Sync block "1" is formed with a monotone bit and sync "1". Sync block "2" is formed with a monotone bit and sync "2". Sync block "3" is formed with a monotone bit and sync "3".

FIG. 2C is a diagram of a detailed frame structure of a data part of an address block (ADIP) of FIG. 2A.

A data part is formed with 15 ADIP blocks. Each ADIP block is 5 bits long. Each 5-bit ADIP block is formed with 1 bit of a monotone bit and 4 bits of ADIP bits.

Referring to FIG. 2C, address information is 60 bits long in the 75-bit data part excluding 15 bits of monotone bits. The structure of this 60-bit address information is shown in FIG. 2D.

Referring to FIG. 2D, 60-bit address information includes an address part, a reservation part, and a parity part.

Thus, when the circumference of an area where a recording and/or reproducing unit block is recorded is shorter than the length of the recording and/or reproducing unit block, an overlapping area occurs and the error correction capability is substantially lowered such that a problem of reliability of data can be caused.

SUMMARY OF THE INVENTION

The invention provides a recording and/or reproducing apparatus, a disk manufacturing apparatus, a recording and/or reproducing method, a disk manufacturing method, in which areas using different recording and/or reproducing unit blocks are disposed in a recordable area of an information recording area and addresses appropriate to the areas can be used, and an information recording medium thereof.

According to an aspect of the invention, there is provided a recording and/or reproducing apparatus including: a signal processing unit which performs signal processing of a first address and a second address to distinguish a first area disposed in a data recordable area of an information recording medium, from a second area disposed in the data recordable area and using a recording and/or reproducing unit block having a size different from that of a recording and/or reproducing unit block used in the first area, and records data on or reads data from the information recording medium; and a control unit which controls the signal processing unit for recording and/or reproducing data using the first address in the first area of the information recording medium and the second address in the second area.

The signal processing unit may include a wobble signal processing unit having a first wobble processing unit which processes the first address by a first wobble processing method and a second wobble processing unit which processes the second address by a second wobble processing method, and the control unit controls such that the first address of the data is processed by the first wobble processing unit when data is recorded or reproduced in the first area, and the control unit controls such that the second address of the data is processed by the second wobble processing unit when data is recorded or reproduced in the second area.

The wobble modulation method used by the first wobble processing method may be different from the wobble modulation method used by the second wobble processing method, and the first wobble processing method may use binary phase shift keying (BPSK) and the second wobble processing method may use frequency shift keying (FSK).

The basic frequency used by the first wobble processing method may be different from the basic frequency used by the second wobble processing method, or the wobble cycle of channel clocks used by the first wobble processing method may be different from the wobble cycle of channel clocks used by the second wobble processing method.

The signal processing unit may include a first address detection unit which detects the first address; and a second address detection unit which detects the second address, and the control unit may control such that the first address of the data is detected by the first address detection unit when data is recorded or reproduced in the first area, and the control unit may control such that the second address of the data is detected by the second address detection unit when data is recorded or reproduced in the second area.

The second address may include an identifier which is not included in the first address.

Each of the first address and the second address may consist of a sync and address data, and the identifier included in the second address may be generated by at least any one of changing the repetition times of the sync of the first address, changing the order of the sync of the first address, changing the combination of the sync of the first address, using a predetermined pattern, and using a predetermined combination.

Each of the first address and the second address may consist of a sync and address data, and the identifier included in the second address may be represented by inserting an identifier which is not used in the first address, into the address data of the second address.

The number of bits forming the second address may be different from the number of bits forming the first address.

The signal processing unit may include a wobble signal processing unit having a first wobble processing unit which processes the first address by a first wobble processing method, and a second wobble processing unit which processes the second address by a second wobble processing method; and an address detection unit having a first address detection unit which detects the first address processed by the first wobble processing unit, and a second address detection unit which detects the second address processed by the second wobble processing unit, and the control unit may control such that the first address of the data is processed by the first wobble processing unit and detected by the first address detection unit when data is recorded or reproduced in the first area, and the control unit may control such that the second address of the data is processed by the second wobble processing unit and detected by the second address detection unit when data is recorded or reproduced in the second area.

According to another aspect of the invention, there is provided a disk manufacturing apparatus including: a control unit which controls to generate a first address and a second address on an information recording medium such that a first area disposed in a data recordable area of the information recording medium is distinguished from a second area disposed in the data recordable area and using a recording and/or reproducing unit block having a size different from that of a recording and/or reproducing unit block used in the first area; and a cutting unit which generates the first address and the second address on the information recording medium according to control of the control unit.

The cutting unit may include a modulation unit having a first wobble processing unit which processes the first address by a first wobble processing method and a second wobble processing unit which processes the second address by a second wobble processing method, and the control unit may control such that the first address is processed by the first wobble processing unit when address information is generated in the first area, and the control unit may control such that the second address is processed by the second wobble processing unit when address information is generated in the second area.

Also, the cutting unit may include a signal processing unit having a first address generation unit generating the first address and a second address generation unit generating the second address, and the control unit may control such that the first address is generated by the first address generation unit when the address information is generated in the first area, and the control unit may control such that the second address is generated by the second address generation unit when the address information is generated in the second area.

Also, the cutting unit may include: a modulation unit having a first wobble processing unit which processes the first address by a first wobble processing method and a second wobble processing unit which processes the second address by a second wobble processing method; and a signal processing unit having a first address generation unit which generates the first wobble processed information to fit a first address format, and a second address generation unit which generates the second wobble processed information to fit a second address format, and the control unit may control such that the first address is processed by the first wobble processing unit and generated by the first address generation unit when address information is generated in the first area, and the control unit may control such that the second address is processed by the second wobble processing unit and generated by the second address generation unit when address information is generated in the second area.

According to another aspect of the invention, there is provided a recording and/or reproducing method including recording data on or reproducing data from the information recording medium; and performing signal processing of a first address and a second address to distinguish a first area disposed in a data recordable area of an information recording medium, from a second area disposed in the data recordable area and using a recording and/or reproducing unit block having a size different from that of a recording and/or reproducing unit block used in the first area.

According to another aspect of the invention, there is provided a disk manufacturing method including: generating a first address and a second address on an information recording medium such that a first area disposed in a data recordable area of the information recording medium is distinguished from a second area disposed in the data recordable area and using a recording and/or reproducing unit block having a size different from that of a recording and/or reproducing unit block used in the first area.

According to another aspect of the invention, there is provided an information recording medium including: a first area which is disposed in a data recordable area of the information recording medium and uses a first address; and a second area which is disposed in the data recordable area, uses a recording and/or reproducing unit block having a size different from that of a recording and/or reproducing unit block used in the first area, and uses a second address in order to distinguish the recording and/or reproducing unit block from the recording and/or reproducing unit block of the first area.

The first address may be generated using a wobble modulation method different from a wobble modulation method used in generating the second address; the first address may be generated using a basic frequency different from a basic frequency used in generating the second address; or the first address may be generated using a wobble cycle of channel clocks different from a wobble cycle of channel clocks used in generating the second address.

The second address may include an identifier that is not included in the first address, or the number of bits forming the second address may be different from the number of bits forming the first address.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2A through 2D are diagrams explaining the address structure of an Address In Pregroove that is recorded as a wobbling groove according to a conventional method;

DETAILED DESCRIPTION OF THE PREFERRED EMBODIMENTS

Figure 1:
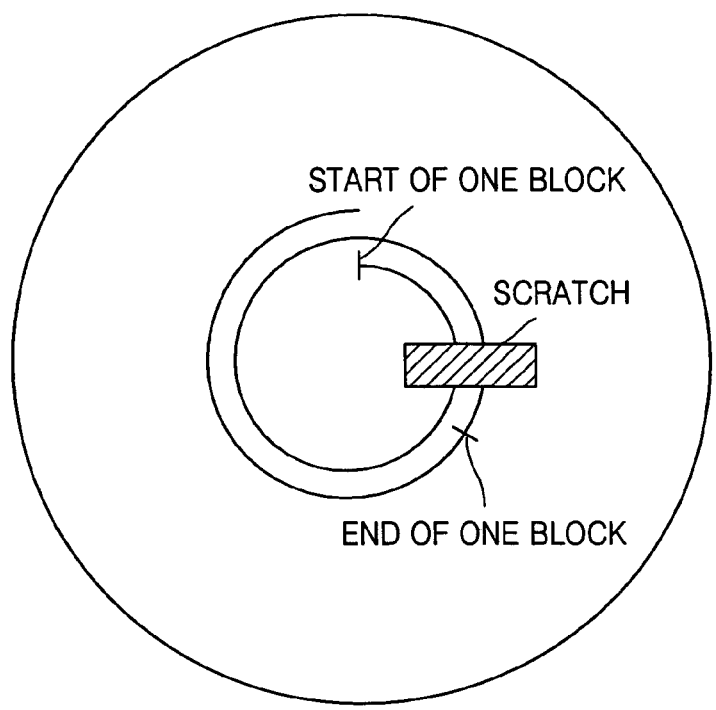
FIG. 1 is a diagram showing a scratch occurring in an overlapping area when the length of a recording and/or reproducing unit block or an error correction code block exceeds one circumference according to a conventional method.
Figure 2A:
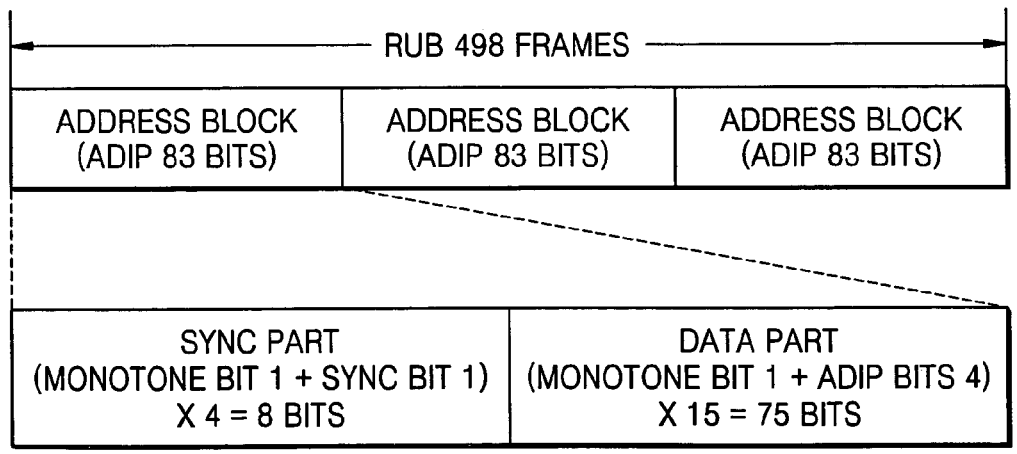
Figure 2B:
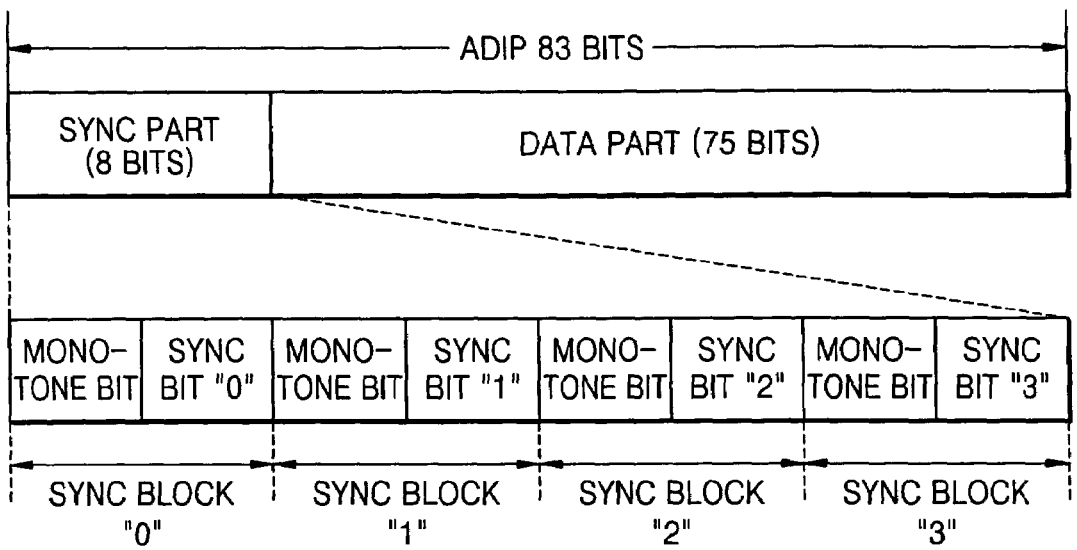
Figure 2C:
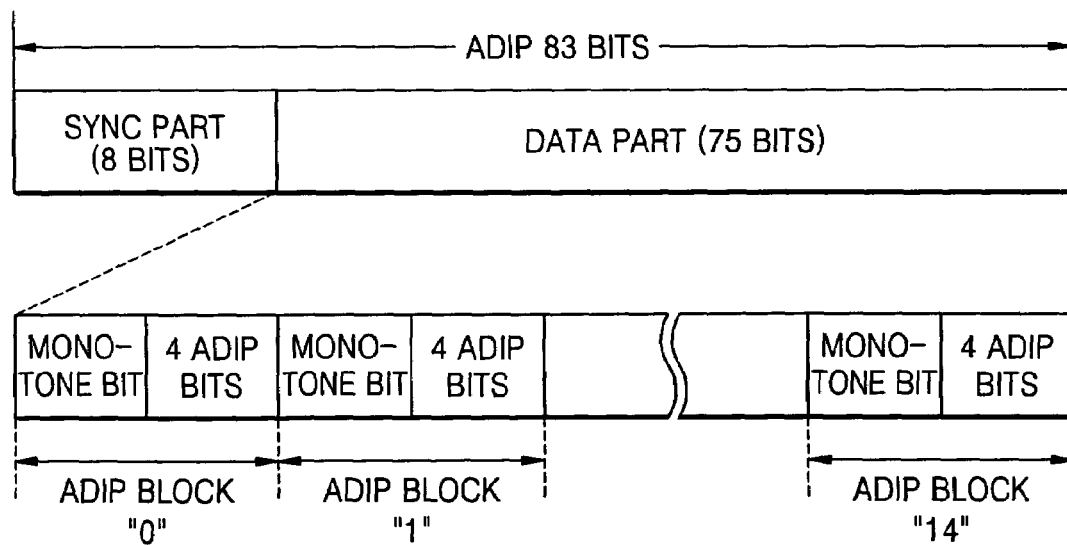

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
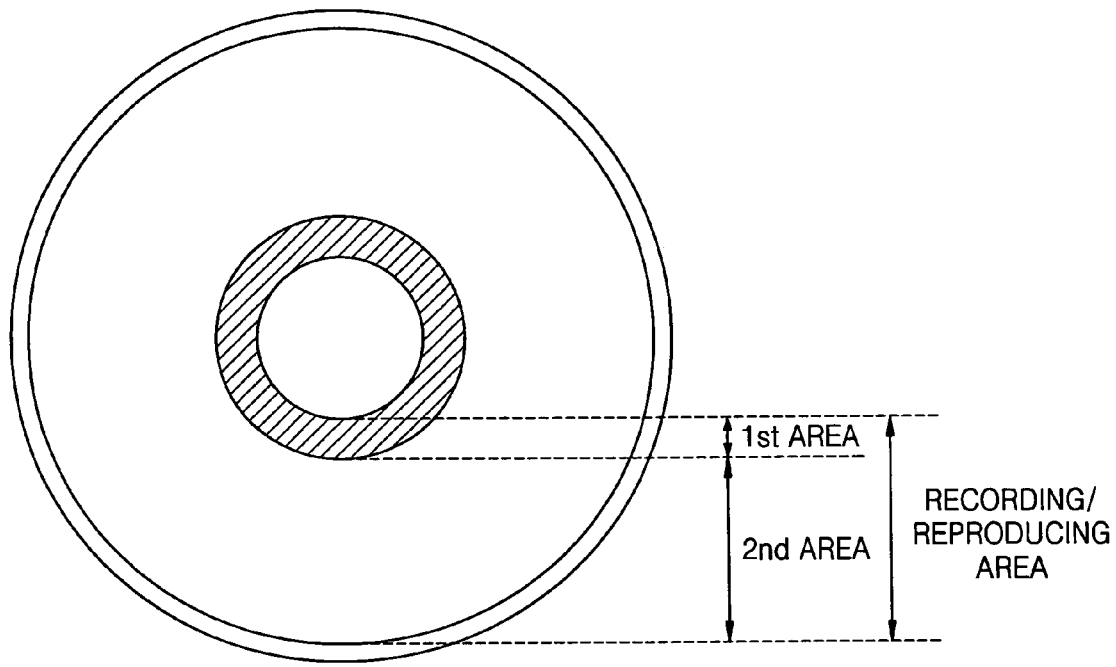
FIG. 3 is a diagram of the structure of a small-sized storage medium to which the invention is applied.

FIG. 3 is a diagram illustrating a structure of a small-sized storage medium to which the invention is applied.

Referring to FIG. 3, a disk includes two areas in a recording and reproducing area. A first area is disposed on an inner circumference of the disk and a second area is disposed on an outer circumference of the disk beginning at a boundary where the first area ends.

In the first area disposed on the inner circumference of the disk, in order to prevent overlapping of one recording/reproducing unit block because of the length of the recording/reproducing unit block being longer than the circumference, a recording and/or reproducing unit block different from the one used in a non-overlapping area is used in the overlapping area. Thus, two different recording and/or reproducing unit blocks are used in a recordable area of an information recording medium, and in order to use these two different recording and/or reproducing unit blocks, addresses applied for respective areas are used. Methods for address modulation for a variety of cases with respect to the types of wobbles and addresses are described below in detail.

First Aspect of the Invention

A first aspect of the invention is a method expressing addresses of a first area and a second area by identical wobble shapes and identical address sizes.

In order to distinguish a first area capable of using the conventional recording and/or reproducing unit block from a second area having a recording and/or reproducing unit block smaller than the recording and/or reproducing unit block used in the first area, an address including an identifier is generated such that the physical lengths of the two recording and/or reproducing unit blocks having identical wobbles and identical addresses recorded in advance on the medium are different. By doing so, two different recording and/or reproducing unit blocks are distinguishable.

In other words, in the second area distinguished from the first area using the conventional addressing method, the physical length of a recording and/or reproducing unit block is changed to express an address. An identifier used in the second area distinguishes the two different areas by at least the times of sync repetition, change in the sync order, change in the sync combination, use of a predetermined pattern, or use of a predetermined combination.

An identifier indicating the second area may be included in a sync part or a data part in order to distinguish the first and second areas. Methods for distinguishing the areas by including an identifier indicating a second area, in a sync part include using a plurality of sync parts used in the first area, as addresses of the second area; changing the order of sync bits used in the first area for addresses of the second area; expressing after changing the combination of sync bits used in the first area; expressing addresses of the second area by inserting a predetermined pattern not used in the first area; and expressing addresses of the second area by inserting a data bit indicating a predetermined value in a predetermined position of an address of the second area, or generating a predetermined combination, which is not used in the first area, by using a predetermined pattern used in the first area and data bits.

A method of distinguishing the first area and the second area by including an identifier indicating a second area in a data part includes using an identifier, which is not used in the first area, in a data part as an address of the second area.

Referring to FIGS. 4A through 9B, examples of the methods for distinguishing first and the second areas are described below:

Using a Plurality of Sync Parts Used in the First Area as Addresses of the Second Area.

Figure 4A:
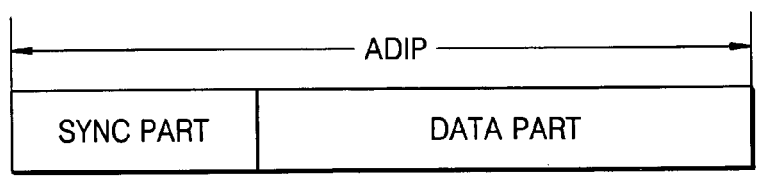
FIGS. 4A and 4B are address structures of a first area and a second area, respectively, expressed by identical wobble shapes and identical addresses according to a first aspect of the invention.
Figure 4B:
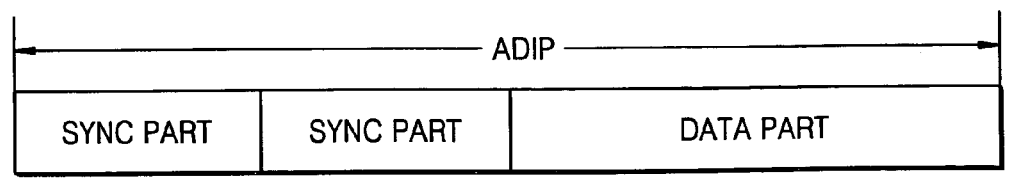

FIGS. 4A and 4B are examples of address structures of a first area and a second area, respectively, expressed by identical wobble shapes and identical addresses according to a first aspect of the invention;

Referring to FIG. 4A, an ADIP address of the first area is formed with a sync part and an address part, and referring to FIG. 4B, a plurality of the sync parts used in the first area are used repeatedly in an ADIP address of the second area such that the first area and the second areas are distinguishable.

Figure 5A:
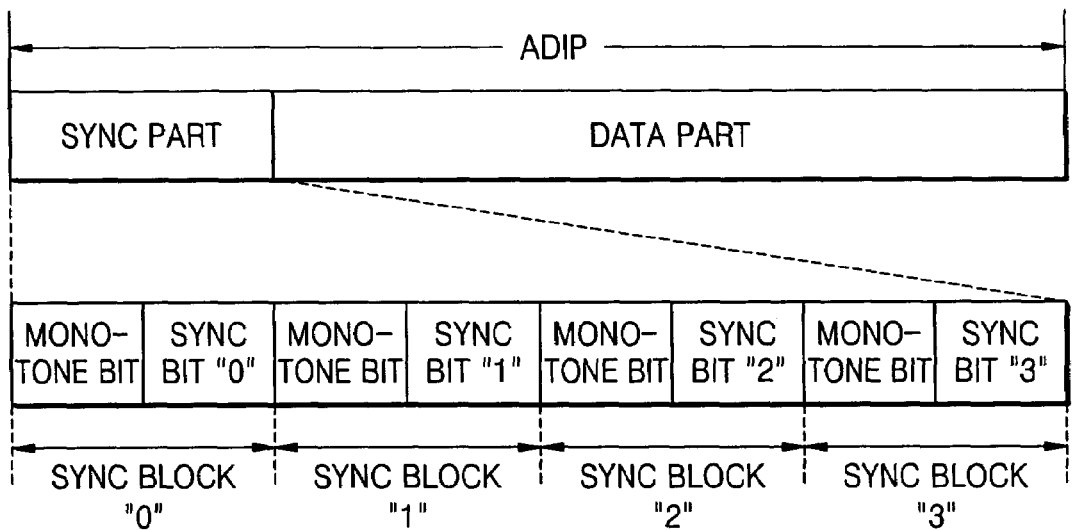
FIGS. 5A and 5B are of address structures of a first area and a second area, respectively, expressed by identical wobble shapes and identical addresses according to the first aspect of the invention.
Figure 5B:
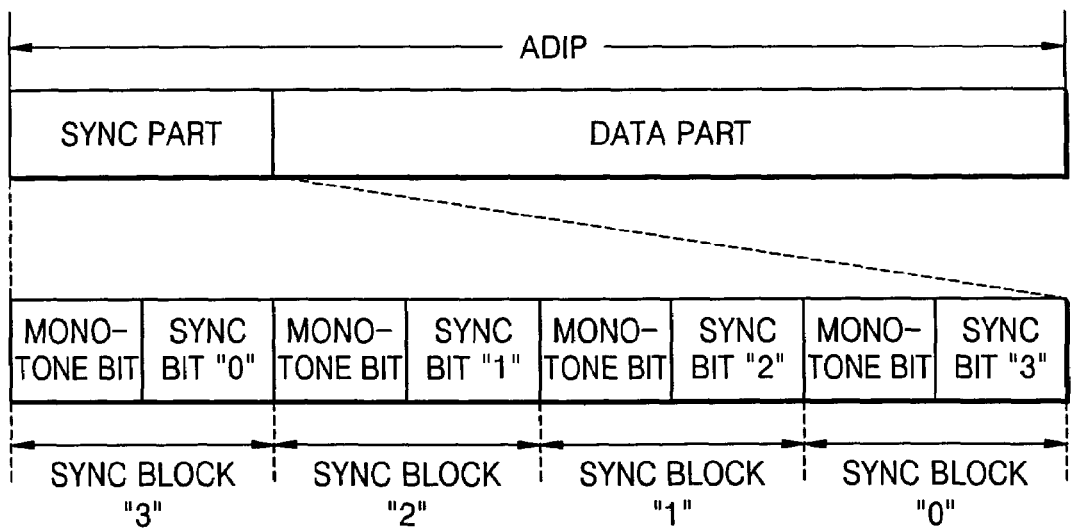

Changing the Order of Sync Bits Used in the First Area for Addresses of the Second Area FIGS. 5A and 5B provide another example of address structures of a first area and a second area, respectively, expressed by identical wobble shapes and identical addresses according to the first aspect of the invention.

Referring to FIG. 5A, each sync block in a sync part of an ADIP address of the first area is formed with a monotone bit and a sync bit. That is, sync block "0" is formed with a monotone bit and sync bit "0", sync block "1" is formed with a monotone bit and sync bit "1", sync block "2" is formed with a monotone bit and sync bit "2", and sync block "3" is formed with a monotone bit and sync bit "3". In the first area, these sync blocks are arranged in order of sync blocks "0", "1", "2", and "3". It is understood by those skilled in the art that the invention is not limited to four sync blocks.

Referring to FIG. 5B, the sync blocks each formed with a monotone bit and a sync bit in the sync part of an ADIP address of the second area are arranged in order of sync blocks "3", "2", "1", and "0". Thus, by changing or reversing the order of sync blocks, the addresses of the first area and the second area are distinguishable.

Expressing After Changing the Combination of Sync Bits Used in the First Area

Figure 6A:
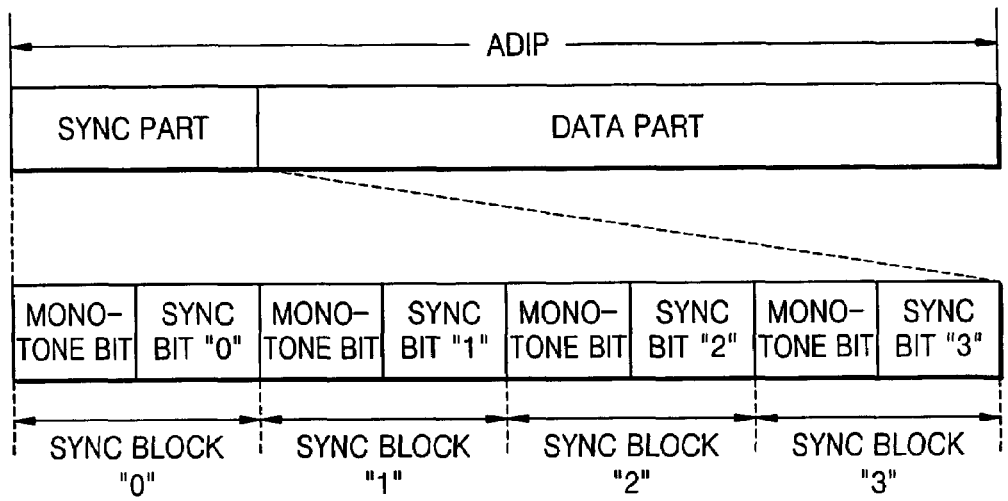
FIGS. 6A and 6B are of address structures of a first area and a second area, respectively, expressed by identical wobble shapes and identical addresses according to the first aspect of the invention.
Figure 6B:
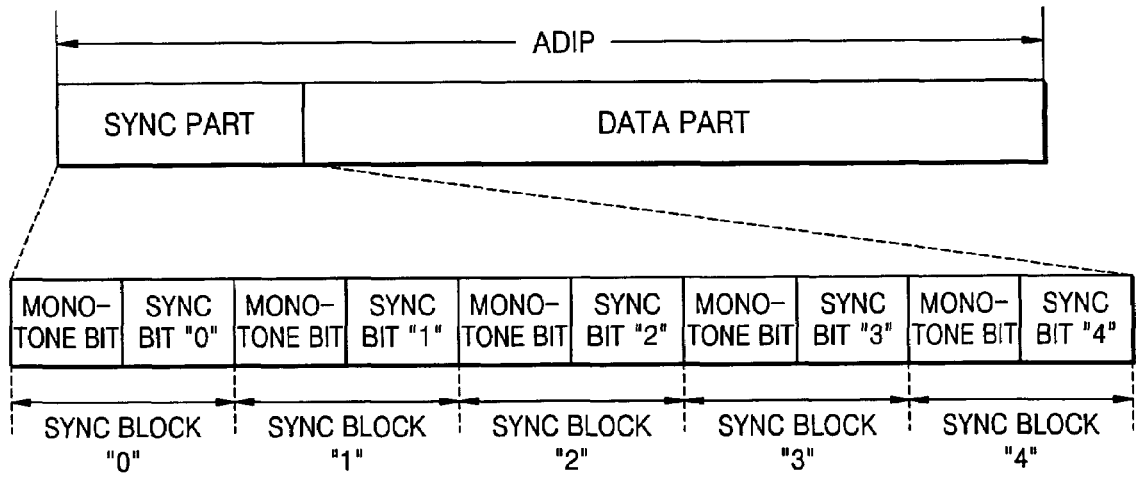

FIGS. 6A and 6B provide another example of address structures of a first area and a second area, respectively, expressed by identical wobble shapes and identical addresses according to the first aspect of the invention.

Referring to FIG. 6A, the sync part of an ADIP address of the first area is formed with four sync blocks "0", "1", "2", and "3". Sync block "0" is formed with a monotone bit and sync bit "0". Sync block "1" is formed with a monotone bit and sync bit "1". Sync block "2" is formed with a monotone bit and sync bit "2". Sync block "3" is formed with a monotone bit and sync bit "3". It is understood by those skilled in the art that the invention is not limited to four sync blocks.

Referring to FIG. 6B, the sync part of an ADIP address of the second area is formed with five sync blocks including the four sync blocks used in the first area and sync block "4". Thus, by using additional sync blocks, which are each a combination of a monotone bit and sync bit, in the second area as compared to the first area, the first area and the second area are distinguishable.

Figure 7A:
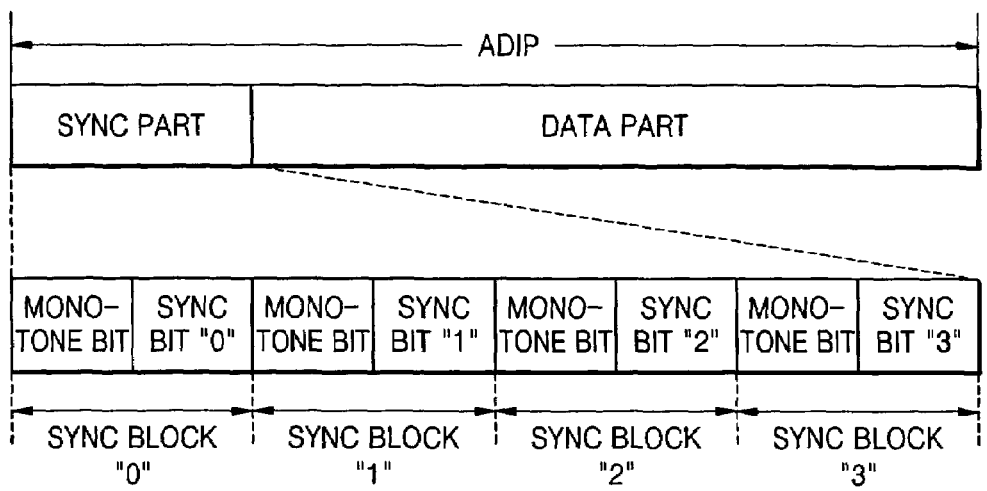
FIGS. 7A and 7B are of address structures of a first area and a second area, respectively, expressed by identical wobble shapes and identical addresses according to the first aspect of the invention.
Figure 7B:
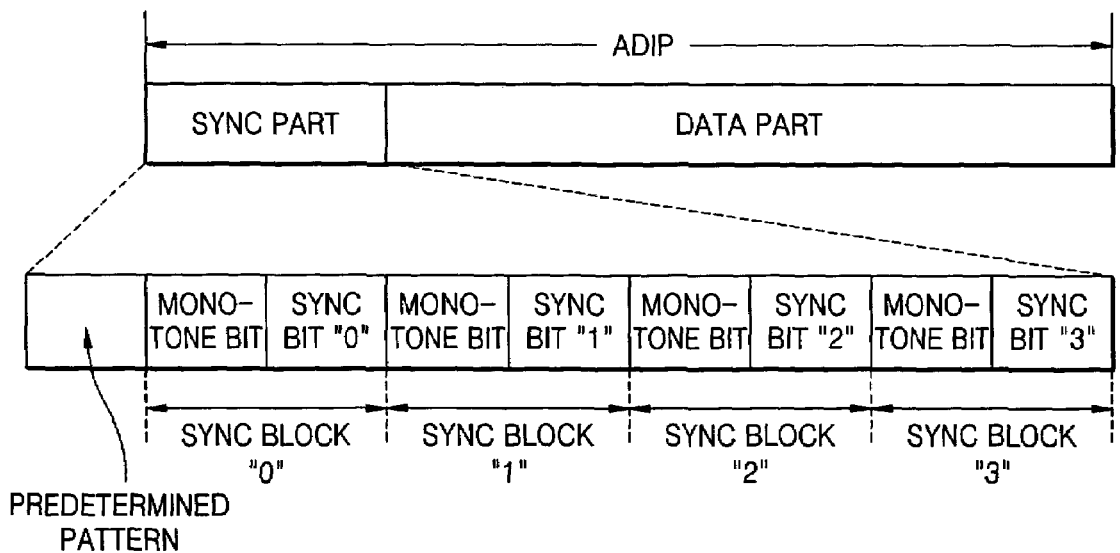

Expressing Addresses of the Second Area by Inserting a Predetermined Pattern not Used in the First Area FIGS. 7A and 7B provide another example of address structures of a first area and a second area, respectively, expressed by identical wobble shapes and identical addresses according to the first aspect of the invention.

Referring to FIG. 7A, an ADIP address of the first area is formed with a sync part and a data part. The sync part of the ADIP Address of the first area is formed with four sync blocks "0", "1", "2", and "3". Sync "0" is formed with a monotone bit and sync bit "0." Sync "1" is formed with a monotone bit and sync bit "1." Sync block "2" is formed with a monotone bit and a sync bit "2." Sync block "3" is formed with a monotone bit and a sync bit "3."

Referring to FIG. 7B, it can be seen that a predetermined pattern is inserted in the front part of the sync part in an ADIP address of the second area such that the address of the second area is distinguishable from that of the first area. By using a pattern distinct from the monotone bit, sync bit, or ADIP bits used in the first area, as this predetermined pattern, the predetermined pattern can be used as an identifier to distinguish the first area and the second area. The identifier can be inserted in a predetermined location of the sync part, for example, in either the front or back of the sync part. It is understood by those skilled in the art that the invention is not limited to four sync blocks.

Figure 8A:
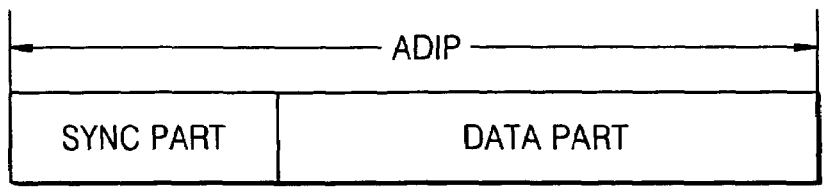
FIGS. 8A and 8B are of address structures of a first area and a second area, respectively, expressed by identical wobble shapes and identical addresses according to the first aspect of the invention.
Figure 8B:
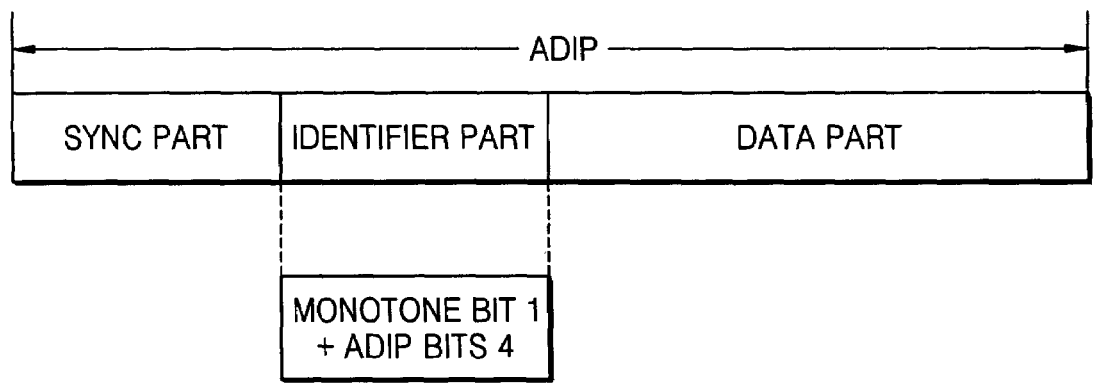

Expressing Addresses of the Second Area by Inserting a Data Bit Indicating a Predetermined Value in a Predetermined Position of an Address of the Second Area, or Generating a Predetermined Combination, Which is Not Used in the First Area, by Using a Predetermined Pattern Used in the First Area and Data Bits FIGS. 8A and 8B provide another example of address structures of a first area and a second area, respectively, expressed by identical wobble shapes and identical addresses according to the first aspect of the invention.

Referring to FIGS. 8A and 8B, by using the monotone bit, sync bit, and ADIP bits expressing data to form a new part that is not used in the first area, for example, an identifier part, an address of the second area, can be identified. For example, by combining the monotone bit and ADIP bits expressing data, an identifier part is generated and inserted between a sync part and a data part, such that it can be used as an identifier to distinguish the first area and the second area. For example, by using monotone bit 1 and the ADIP bit four times, an identifier can be formed and used.

Referring to FIG. 8A, the ADIP address of the first area is formed with a sync part and a data part. Referring to FIG. 8B, an identifier part is inserted between the sync part and the data part in the ADIP address of the second area. Thus, the identifier part formed with 1 monotone bit and 4 ADIP bits are distinguishable from the first area and the second area.

Figure 9A:
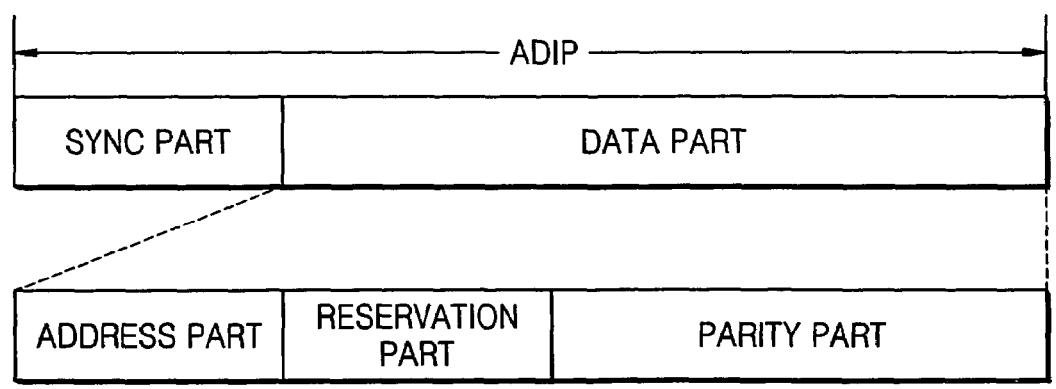
FIGS. 9A and 9B are of address structures of a first area and a second area, respectively, expressed by identical wobble shapes and identical addresses according to the first aspect of the invention.
Figure 9B:
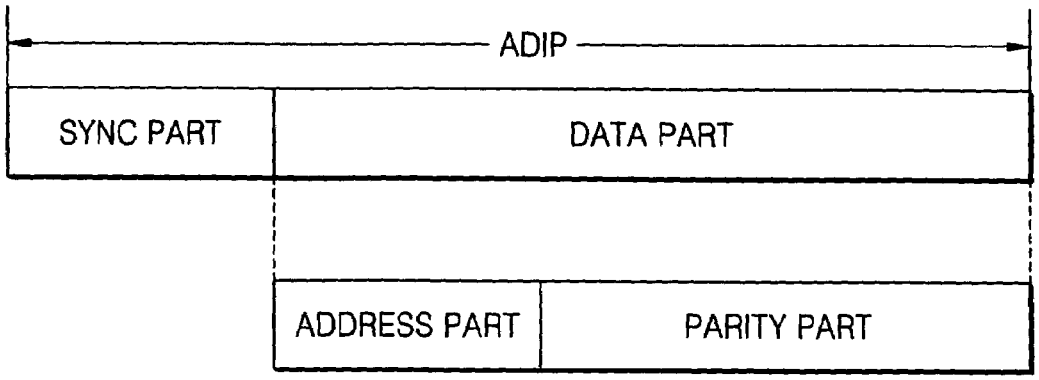

Using an Identifier, Which is not Used in the First Area, in a Data Part as an Address of the Second Area FIGS. 9A and 9B provide another example of address structures of a first area and a second area, respectively, expressed by identical wobble shapes and identical addresses according to the first aspect of the invention.

Referring to FIG. 9A, the ADIP address of the first area is formed with a sync part and a data part, and the data part includes an address part, a reservation part, and a parity part.

Referring to FIG. 9B, the ADIP address of the second area is formed with a sync part and a data part, and the data part includes an address part and a parity part. Thus, when a reserve bit is included in the bits expressing the ADIP address in the first area, this reserve bit is excluded to express an ADIP in the second area and to change the interval of detecting a sync such that the second area can be identified.

Second Aspect of the Invention

A second aspect of the invention is a method of expressing addresses of the first area and the second area with two different wobbles.

In order to distinguish a first area capable of using a conventional recording and/or reproducing unit block, from a second area having a recording and/or reproducing unit block smaller than the recording and/or reproducing unit block used in the first area, the first area and the second area are expressed by two different wobbles such that the two different recording and/or reproducing unit blocks are distinguishable. That is, for the two different wobbles used in the first and second areas, different modulation methods of wobbles and/or different basic frequencies can be used such that the two areas are distinguishable. More specific examples are described below.

For example, the first and the second area use different wobble modulation methods. In the first area, frequency shift keying (FSK) is used and in the second area, binary phase shift keying (BPSK) is used such that two recording and/or reproducing unit blocks are distinguishable.

For example, as the wobble modulation method of the first and second areas, FSK or BPSK is used identically, while different wobble basic frequencies are used for the first area and the second area, respectively, such that the two recording and/or reproducing unit blocks are distinguishable. For example, if the size of the unit block of the first area is 64 KB and that of the second area is 32 KB, a wobble basic frequency obtained by doubling the wobble basic frequency of the first area is used as the wobble basic frequency of the second area, that is, when the basic frequency of the first area is 1 MHz, 2 MHz is used as the basic frequency of the second area. As such, the two recording and/or reproducing unit blocks are distinguishable. Further, when a wobble cycle of the first area is a number n channel clock cycles, a number m channel clock cycles can be used for the wobble cycle of the second area such that the two unit blocks are distinguishable. Here, n and m denote arbitrary integers.

In another example, the first and second methods for distinguishing the first and second area of the data can be combined and used.

As a wobble modulation method, the first area uses FSK and the second area uses BPSK, while the first and second areas use f0 and f1, respectively, as reference wobble frequencies, such that the two different areas are distinguishable.

Third Aspect of the Invention

A third aspect of the invention is a method of expressing addresses of the first and second areas with two different addresses, respectively.

In order to distinguish a first area capable of using the conventional recording and/or reproducing unit block, from a second area having a recording and/or reproducing unit block smaller than the recording and/or reproducing unit block used in the first area, the first and the second areas are expressed by two different addresses such that the two different recording and/or reproducing unit blocks are distinguishable. For example, as the addresses used in the first area and the second area, two addresses having different numbers of bits are used to distinguish the two different areas.

Figure 10A:
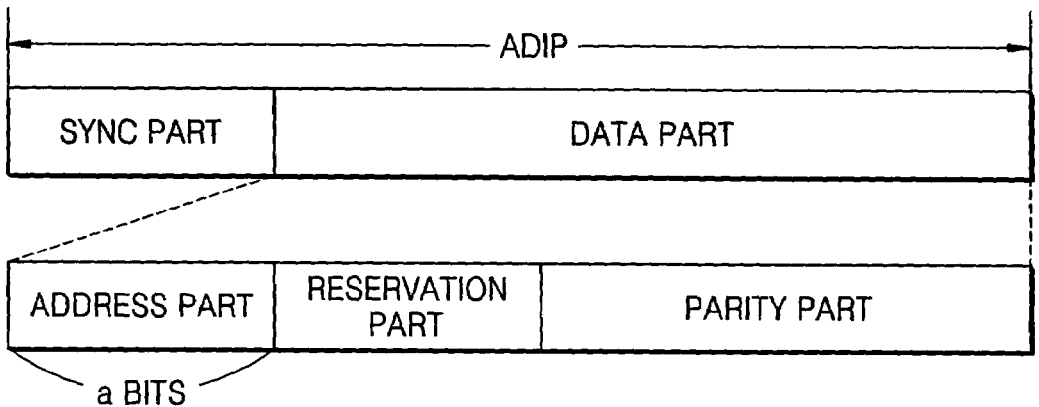
FIGS. 10A and 10B are address structures of a first area and a second area, respectively, expressed by two different addresses according to a third aspect of the invention.
Figure 10B:
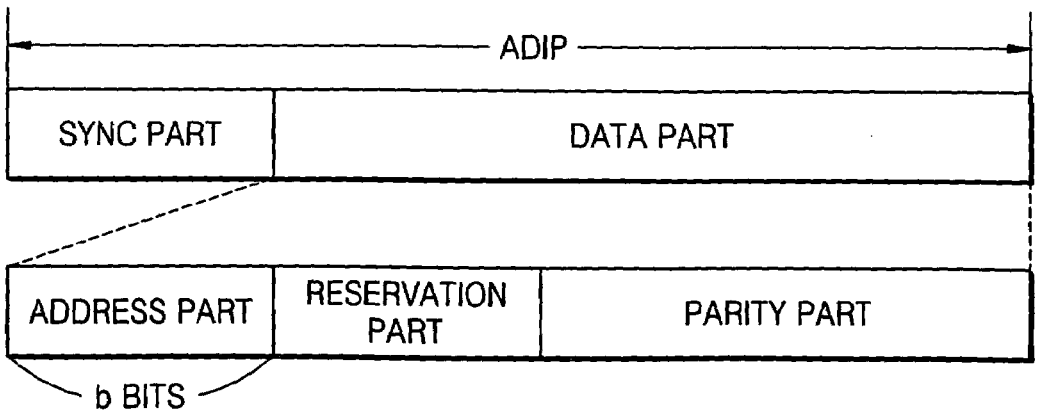

FIGS. 10A and 10B provide an example of address structures of a first area and a second area, respectively, expressed by two different addresses according to the third aspect of the invention.

Referring to FIG. 10A, the size of the address part included in the data part in the first area is made to be "a" bits, wherein "a" is an integer value. Referring to FIG. 10B, the size of the address part included in the data part in the second area is made to be "b" bits, wherein "b" is an integer value. As such, the first area and the second area are easily distinguishable.

Fourth Aspect of the Invention

A fourth aspect of the invention is a method expressing the addresses of the first area and the second area by two different wobbles and two different addresses, respectively.

In order to distinguish a first area capable of using the conventional recording and/or reproducing unit block, from a second area having a recording and/or reproducing unit block smaller than the recording and/or reproducing unit block used in the first area, the first area and the second area are expressed by two different wobbles and two different addresses such that the two different recording and/or reproducing unit blocks are distinguishable.

For example, the two different areas are distinguishable by using different wobble modulation methods and addresses having: different numbers of bits for the first area and the second area, respectively; an identical number of bits but having an identifier in one or a plurality of predetermined bits of the addresses to distinguish the areas; different basic frequencies and addresses having different numbers of bits; different basic frequencies and addresses having an identical number of bits but having an identifier in one or a plurality of predetermined bits of the addresses to distinguish the areas; different basic frequencies and a different number of bits; or wobbles having different basic frequencies and modulation methods and addresses having an identical number of bits but having an identifier in one or a plurality of predetermined bits of the addresses to distinguish the areas. More specific examples are explained below.

By using FSK and an address of 'a' bits in the first area and BPSK and an address of 'b' bits in the second area, the two recording and/or reproducing unit blocks are distinguishable.

As a wobble modulation method, FSK is used in the first area and BPSK is used in the second area, and an address of 'a' bits is used both in the first and second areas, and by making the most significant bit '0' and '1', respectively, and using as an identifier to determine an area, the two recording and/or reproducing unit blocks are distinguishable.

As another method, as a wobble modulation method, FSK or BPSK is used both in the first area and the second area, and by using a basic wobble frequency of f0 and an address of 'a' bits in the first area and a basic wobble frequency of f1 and an address of 'b' bits in the second area, the two recording and/or reproducing unit blocks are distinguishable.

As another method, as a wobble modulation method, FSK or BPSK is used both in the first area and the second area, and a basic wobble frequency of f0 is used in the first area and a basic wobble frequency of f1 is used in the second area, and an address of 'a' bits is used both in the first and second areas, and by making the most significant bit '0' and '1', respectively, and using as an identifier to determine an area, the two recording and/or reproducing unit blocks are distinguishable.

As another method, a basic wobble frequency of f0, FSK, and an address of 'a' bits are used in the first area, and a basic wobble frequency of f1, BPSK, and an address of 'b' bits are used in the second area, such that two recording and/or reproducing unit blocks are distinguishable.

As another method, a basic wobble frequency of f0 and FSK are used in the first area, and a basic wobble frequency of f1 and BPSK are used in the second area, and an address of 'a' bits is used both in the first and second areas, and by making the most significant bit '0' and '1', respectively, and using as an identifier to determine an area, the two recording and/or reproducing unit blocks are distinguishable.

Figure 11:
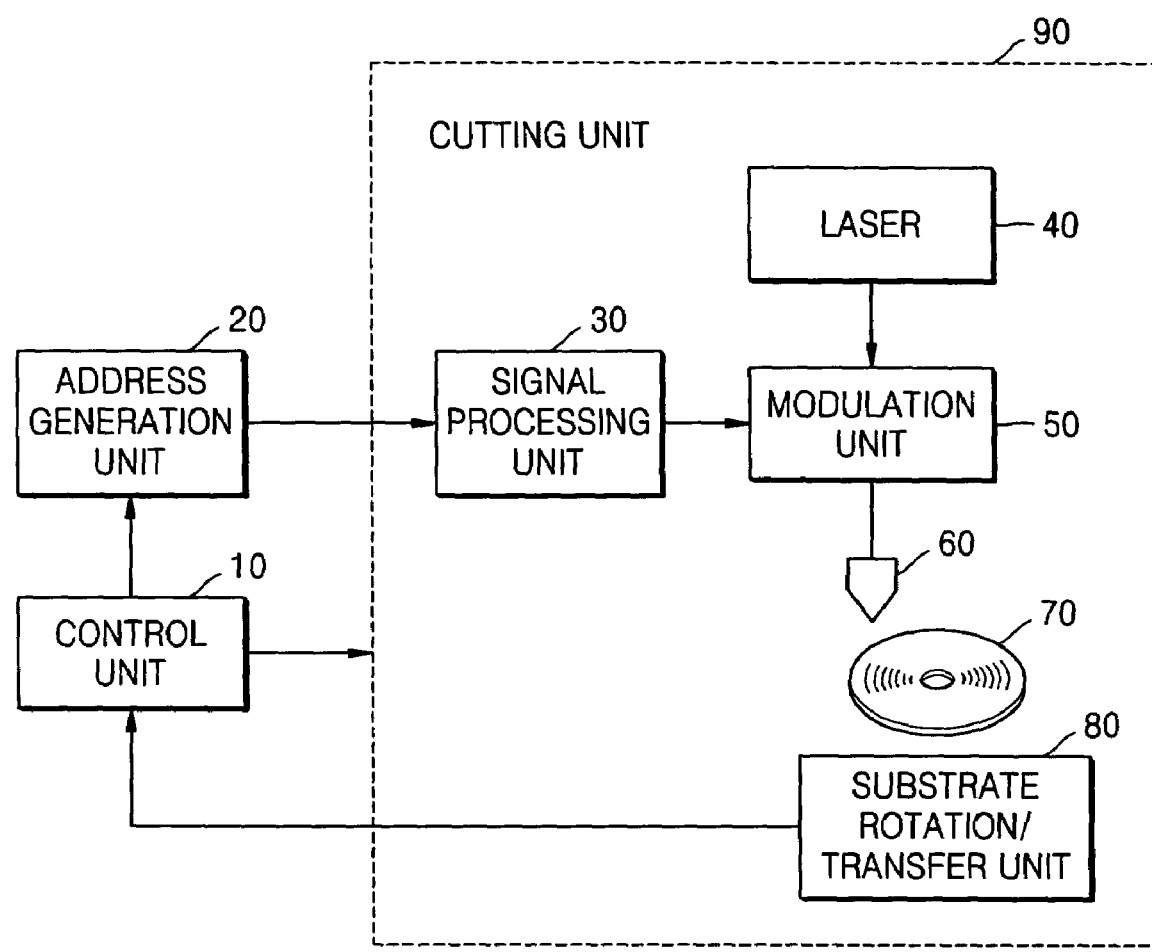
FIG. 11 is a schematic block diagram of a disk manufacturing apparatus according to the invention.

FIG. 11 is a schematic block diagram of a disk manufacturing apparatus according to the invention.

Referring to FIG. 11, the disk manufacturing apparatus includes a control unit 10, an address generation unit 20, a signal processing unit 30, a laser unit 40, a modulation unit 50, a cutting head 60, and a substrate rotation/transfer unit 80.

In a disk manufacturing process, photoresist is applied to a ground glass substrate, and cutting is performed such that a pit or groove is formed on the photoresist film by a laser beam or light exposure. In particular, in the manufacturing process according to the invention, in a recordable area, the cutting of grooves by wobbling based on a first address is performed in a first area disposed on the inner circumference side, and cutting of grooves by the wobbling based on a second address is performed in a second area disposed on the outer circumference side.

The address generation unit 20 generates values as absolute addresses, preferably sequentially. The cutting unit 60 includes an optical unit 40, 50, and 60 that applies a laser beam to the photoresist filmed glass substrate 70 to perform a cutting generation, the substrate rotation/transfer unit 80 that rotates and slide-transfers the glass substrate 70, and the signal processing unit 30 that converts input data into recording data and provides to the optical unit.

The modulation unit 50 modulates the light irradiated by the laser light source 40 based on the recording data, the cutting head unit 60 collects modulated beam from the modulation unit 50 and applies to the photoresist surface of the glass substrate 70.

The substrate rotation/transfer unit 80 drives rotation of the glass substrate 70, slides the glass substrate 70 in the direction of the radius of the glass substrate 70, and plays a role of a servo controlling the operation, such as tracking, of the cutting head 60.

The signal processing unit 30 formats input data by adding an error correction code and others based on address information provided by the address generation unit 20, or generates a modulated signal by performing a predetermined operation for formatted data.

When cutting is performed, while rotating the glass substrate 70 by driving the rotation at a constant linear velocity, the substrate rotation/transfer unit 80 slides the glass substrate 70 such that a spiral track with a predetermined track pitch can be formed. The light irradiated by the laser light source 40 is generated as a modulation beam based on a modulation signal from the signal processing unit 30, through the modulation unit 50, and then applied to the photoresist surface of the glass substrate 70 through the cutting head unit 60, and as a result, the photoresist responds based on the data or groove.

The control unit 10 controls the operation of the cutting unit 90 when cutting is performed, and controls the address generation unit 20 with respect to the cutting position of the substrate rotation/transfer unit 80. In particular, when the control unit 10 determines that the cutting position of the substrate rotation/transfer unit 80 is in a first area located on the inner circumference of the disk according to the invention, the control unit 10 controls the address generation unit 20 and the cutting unit 90 such that cutting is performed based on a first address. When this cutting operation is performed to the end part of the first area and the control unit 10 determines that the cutting position is in a second area, the control unit 10 controls the address generation unit 20 and the cutting unit 90 such that cutting is performed based on a second address.

Figure 12:
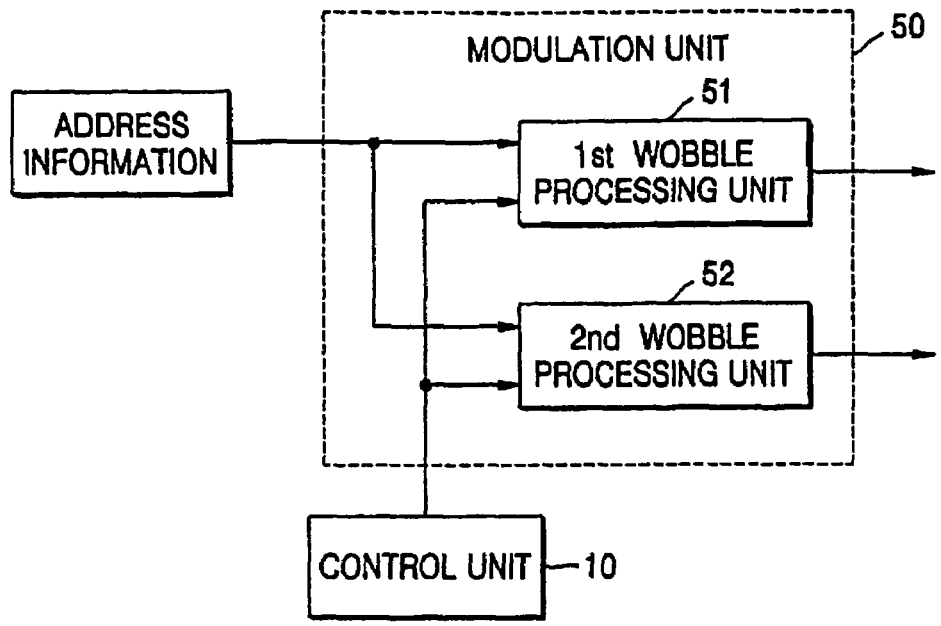
FIG. 12 is a detailed block diagram of the signal processing unit and the modulation unit shown in FIG. 11 according to a second aspect of the invention.

FIG. 12 is a detailed block diagram of the modulation unit shown in FIG. 11 according to the second aspect of the invention. Referring to FIG. 12, the modulation unit 50 includes a first wobble processing unit 51 and a second wobble processing unit 52. In a case of an address for the first area of the disk, the control unit controls to modulate and record the address by a first modulation method, and in the case of an address for the second area of the disk, controls to modulate and record the address by a second modulation method.

The control unit 10 determines whether an address currently desired to be cut is for the first area or the second area. If the address is for the first area, the control unit 10 controls to activate the first wobble processing unit 51. If the address is for the second area, the control unit 10 controls to activate the second wobble processing unit 52.

When the first wobble processing unit 51 is activated, the first wobble processing unit 51 receives address information from the signal processing unit 30 and performs modulation according to the first modulation method. When the second wobble processing unit 52 is activated, the second wobble processing unit 52 receives address information from the signal processing unit 30 and performs modulation according to the second modulation method. Then, the modulated data is transmitted to the cutting head 60.

Here, the first and second modulation methods are distinguishable by a variety of methods, as previously discussed, with reference to the second aspect of the invention.

Figure 13:
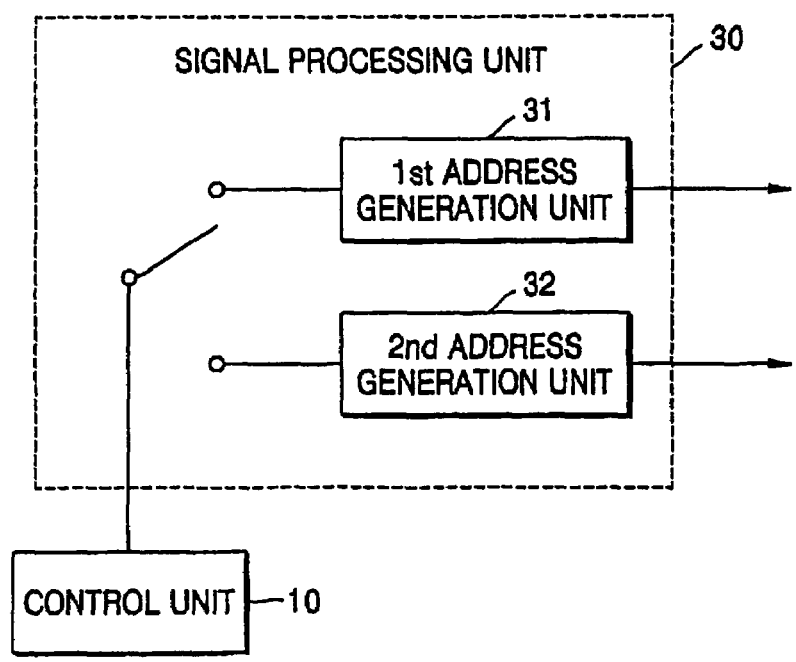
FIG. 13 is a detailed block diagram of the signal processing unit and the modulation unit shown in FIG. 11 according to the first and third aspects of the invention.

FIG. 13 is a detailed block diagram of the signal processing unit shown in FIG. 11 according to the first and third aspects of the invention.

According to the first or third aspect of the invention, in a case of an address for the first area of the disk, the control unit 10 controls to generate a first address, and in the case of an address for the second area of the disk, controls to generate a second address.

The control unit 10 determines whether an address currently desired to be cut is for the first area or the second area. If the address is of the first area, the control unit 10 controls to activate the first address generation unit 31. If the address is of the second area, the control unit 10 controls to active the second address generation unit 32.

When the first address generation unit 31 is activated, the first address generation unit 31 receives address data from the address generation unit 20 and generates a first address. When the second address generation unit 32 is activated, the second address generation unit 32 receives address data from the address generation unit 20 and generates a second address. The generated address information is outputted to the modulation unit 50. Here, the first address and the second address are distinguishable by a variety of methods as previously discussed with reference to the first and third aspects of the invention.

Figure 14:
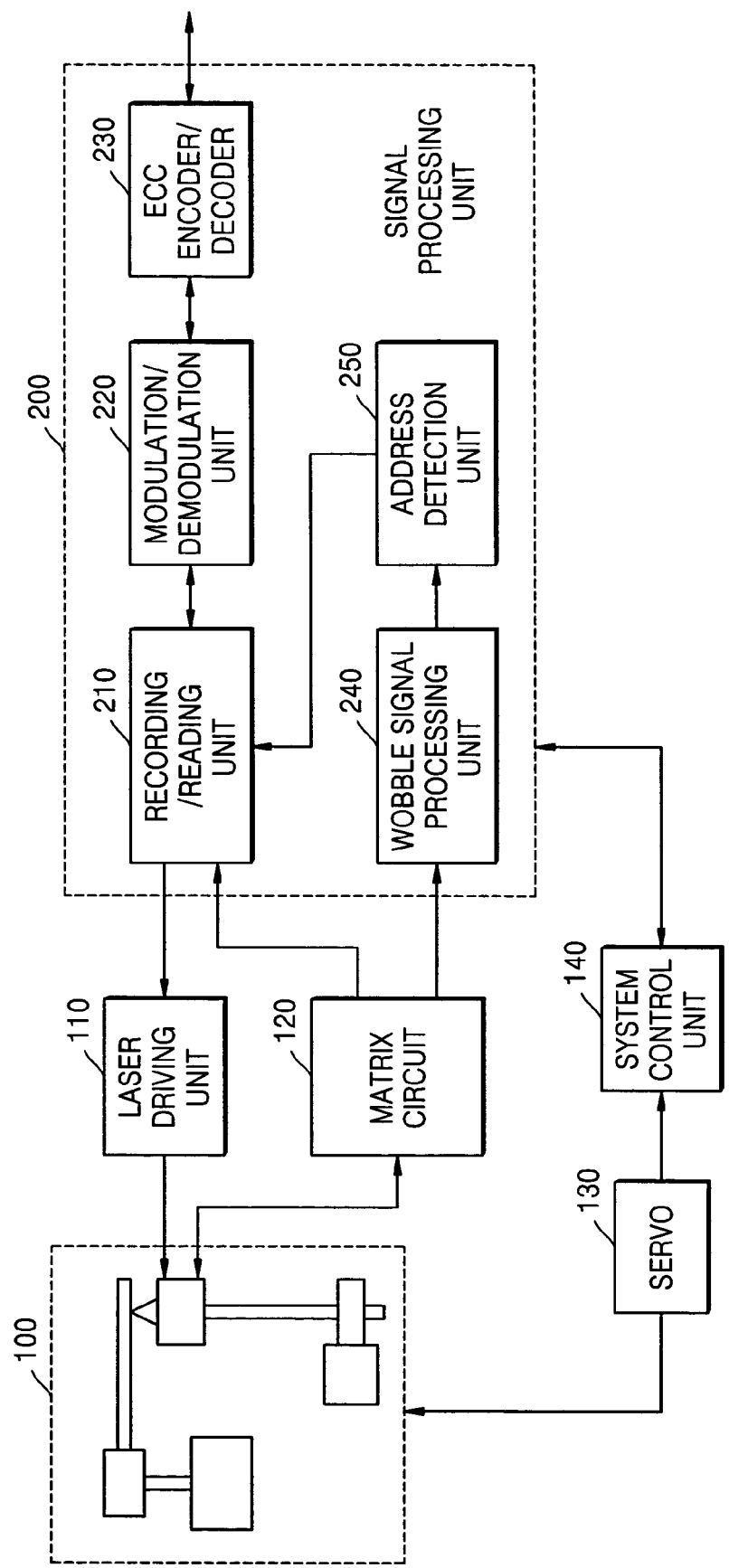
FIG. 14 is a schematic block diagram of a disk drive apparatus according to the invention.

FIG. 14 is a schematic block diagram of a disk drive apparatus according to an aspect of the invention. Referring to FIG. 14, the disk drive apparatus includes a pickup 100, a laser driving unit 110, a matrix circuit 120, a servo 130, a system control unit 140, and a signal processing unit 200.

The pickup 100 reads ADIP information embedded as wobbling of a groove track in a recordable area on the disk. When data is recorded, user data is recorded as a phase change mark on a track in the recordable area by the pickup 100, and when data is reproduced, a recorded phase change mark is read by the pickup 100.

The laser diode of the pickup 100 is driven to emit laser light by a drive signal from the laser driving unit 110. Information on the light reflected from the disk is detected by a photo detector, converted into an electrical signal with respect to the received light amount, and provided to the matrix circuit 120.

The matrix circuit 120 receives the output current from the photo detector, and generates a high frequency signal corresponding to reproduction data, a signal for servo control, and a signal related to the wobbling of a groove.

The reproduction data signal output from the matrix circuit 120 is provided to the recording/reading unit 210, the servo control signal is provided to the servo 130, and the signal related to wobbling is provided to the wobble signal processing unit 240.

The recording/reading unit 210 performs binarization of the reproduction data signal, and by performing generation of a reproduction clock by a phase locked loop (PLL) and other processing, reproduces data read as a phase change mark, and provides the reproduced data to the modulation/demodulation unit 220.

The modulation/demodulation unit 220 performs a decoder function when the data is reproduced, and an encoder function when the data is recorded. When data is reproduced, the modulation/demodulation unit 220 performs demodulation of an RLL code according to a reproduction clock, as a decoding process.

The ECC encoder/decoder 230 performs ECC encoding for adding an error correction code when data is recorded, and ECC decoding for error correction when data is reproduced. Data decoded as reproduction data in the ECC encoder/decoder 230 is read based on the control of the system control unit 140 and transmitted to an audio/visual (AV) system.

A push-pull signal related to wobbling of a groove output from the matrix circuit 120 is processed in the wobble signal processing unit 240. The push-pull signal as ADIP information is demodulated in the wobble signal processing unit 240 and demodulated into a data stream forming an ADIP address and provided to the address detection unit 250.

The address detection unit 250 decodes the provided data, obtains an address value, and provides to the system control unit 140 and the record/reading unit 210.

In particular, if the data to be recorded/reproduced is an address of the first area of the disk, the system control unit 140 controls the wobble signal processing unit 240 or the address detection unit 250 to process the address as a first address, and if the data to be recorded/reproduced is an address of the second area of the disk, the system control unit 140 controls the wobble signal processing unit 240 or the address detection unit 250 to process the address as a second address.

Figure 15:
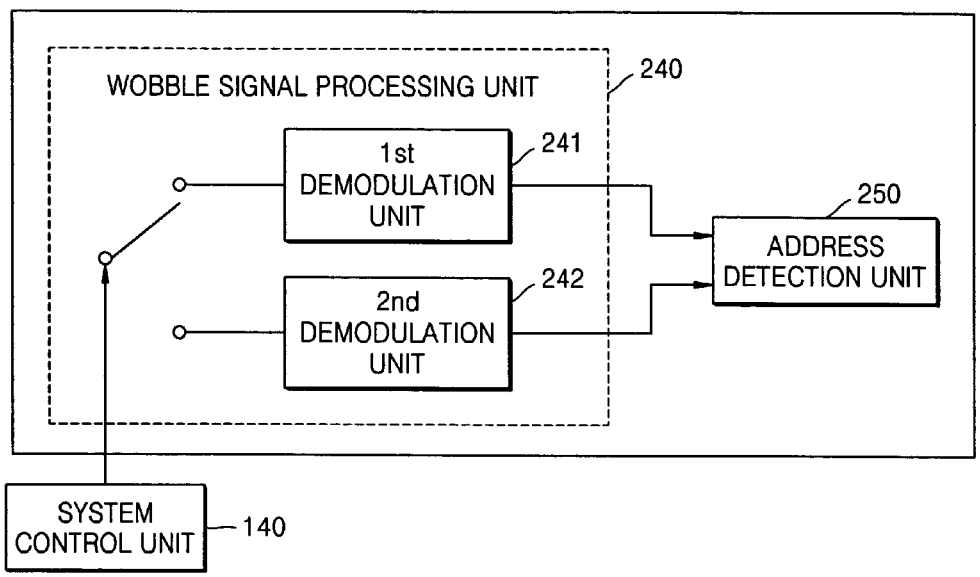
FIG. 15 is a detailed block diagram of a wobble signal processing unit shown in FIG. 14 according to the second aspect of the invention.

FIG. 15 is a detailed block diagram of the wobble signal processing unit shown in FIG. 14 according to the second aspect of the invention. Referring to FIG. 15, the wobble signal processing unit 240 includes a first demodulation unit 241 and unit 242.

According to the second aspect of the invention, in case of an address of the first area of the disk, the system control unit 140 controls such that the address is demodulated by a first demodulation method and detected, and in case of an address of the second area of the disk, the system control unit 140 controls such that the address is demodulated by a second demodulation method and detected.

The system control unit 140 determines whether an address currently desired to be recorded/reproduced is for the first area or the second area, and if the address is for the first area, the system control unit 140 controls to activate the first demodulation unit 241, and if the address is of the second area, the system control unit 140 controls to activate the second demodulation unit 242.

When the first demodulation unit 241 is activated, the first demodulation unit 241 performs demodulation of a signal related to the wobbling groove and received from the matrix circuit 120, according to a first demodulation method. When the second demodulation unit 242 is activated, the second demodulation unit 242 performs demodulation of a signal related to the wobbling groove and received from the matrix circuit 120, according to a second demodulation method. The demodulated data is then transmitted to the address detection unit 250. Here, the first demodulation method and the second demodulation method are distinguishable by a variety of methods as explained above with reference to the second aspect of the invention.

Figure 16:
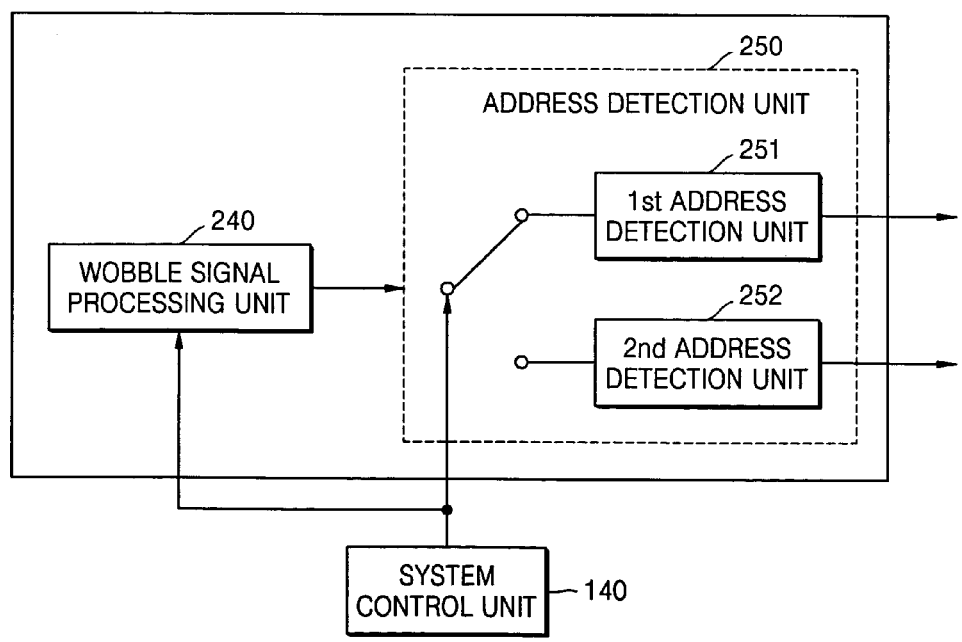
FIG. 16 is a detailed block diagram of the wobble signal processing unit shown in FIG. 14 according to the first and third aspects of the invention.

FIG. 16 is a detailed block diagram of the address detection unit shown in FIG. 14 according to the first and third aspects of the invention.

According to the first or third aspect of the invention, in case of an address of the first area of the disk, the system control unit 140 controls to detect a first address, and in case of an address of the second area of the disk, the system control unit 140 controls to detect a second address.

The system control unit 140 determines whether an address currently desired to be recorded or reproduced is of the first area or the second area, and if the address is of the first area, the system control unit 140 controls to activate the first address detection unit 251, and if the address is of the second area, the system control unit 140 controls to activate the second address detection unit 252.

When the first address detection unit 251 is activated, the first address detection unit 251 detects a first address from the address received from the wobble signal processing unit 240. When the second address detection unit 252 is activated, the second address detection unit 252 detects a second address from the address received from the wobble signal processing unit 240. The detected address information is then output to the system control unit 140 and the recording/reading unit 210. The first address and the second address are distinguishable by a variety of methods as explained above with reference to the first and third aspect of the invention.

The invention can also be embodied as computer readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the invention as described above, when address information or other information is formed in the form of a wobble on an optical disk to access the disk or to read other information, addresses for areas having two different recording and/or reproducing unit blocks are generated by using wobbles different to each other, such that the two different recording and/or reproducing unit blocks having different sizes are distinguishable. Also, by generating addresses having identical wobbles but including an identifier distinguishing the two blocks, the recording and/or reproducing unit blocks having different sizes are distinguishable to prevent overlapping of one recording and/or reproducing unit block such that the efficiency of error correction is enhanced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording and/or reproducing apparatus comprising:
   a signal processing unit to perform signal processing of a first address and a second address formatted differently from the first address to distinguish a first area disposed in a data recordable area of an information recording medium from a second area disposed in the data recordable area, the second area using a recording and/or reproducing unit block having a size that is different from a size of a recording and/or reproducing unit block used in the first area, and to record data on and/or reproduce data from the information recording medium; and
   a control unit to control the signal processing unit to record and/or reproduce data using the first address in the first area and the second address formatted differently from the first address in the second area.

2. The recording and/or reproducing apparatus of claim 1, wherein the signal processing unit comprises a wobble signal processing unit comprising:
   a first wobble processing unit to process the first address by a first wobble processing method; and
   a second wobble processing unit to process the second address by a second wobble processing method;
   wherein the control unit controls the wobble signal processing unit so that the first address is processed by the first wobble processing unit when data is recorded or reproduced in the first area, and the second address is processed by the second wobble processing unit when data is recorded or reproduced in the second area.

3. The recording and/or reproducing apparatus of claim 2, wherein a wobble modulation method used by the first wobble processing method is different from a wobble modulation method used by the second wobble processing method.

4. The recording and/or reproducing apparatus of claim 3, wherein the first wobble processing method uses a binary phase shift key operation (BPSK), and the second wobble processing method uses a frequency shift key operation (FSK).

5. The recording and/or reproducing apparatus of claim 2, wherein a basic frequency used by the first wobble processing method is different from a basic frequency used by the second wobble processing method.

6. The recording and/or reproducing apparatus of claim 2, wherein a number of channel clock cycles of a wobble cycle used by the first wobble processing method is different from a number of channel clock cycles of a wobble cycle used by the second wobble processing method.

7. The recording and/or reproducing apparatus of claim 1, wherein the signal processing unit comprises:
a first address detection unit to detect the first address; and
a second address detection unit to detect the second address;
wherein the control unit controls the first address detection unit and the second address detection unit so that the first address is detected by the first address detection unit when data is recorded or reproduced in the first area, and the second address is detected by the second address detection unit when data is recorded or reproduced in the second area.

8. The recording and/or reproducing apparatus of claim 7, wherein the second address includes an identifier that is not included in the first address.

9. The apparatus of claim 8, wherein each of the first address and the second address comprises a sync and address data; and
wherein the identifier included in the second address is generated by changing repetition times of the sync of the first address, and/or changing an order of the sync of the first address, and/or changing a combination of the sync of the first address, and/or using a predetermined pattern, and/or using a predetermined combination.

10. The recording and/or reproducing apparatus of claim 8, wherein each of the first address and the second address includes a sync and address data; and
wherein the identifier included in the second address is inserted into the address data of the second address.

11. The recording and/or reproducing apparatus of claim 7, wherein a number of bits forming the second address is different from a number of bits forming the first address.

12. The recording and/or reproducing apparatus of claim 1, wherein the signal processing unit comprises:
a wobble signal processing unit comprising:
a first wobble processing unit that processes the first address by a first wobble processing method; and
a second wobble processing unit that processes the second address by a second wobble processing method; and
an address detection unit comprising:
a first address detection unit that detects the first address processed by the first wobble processing units; and a second address detection unit that detects the second address processed by the second wobble processing unit;
wherein the control unit controls the wobble signal processing unit and the address detection unit so that the first address is processed by the first wobble processing unit and is detected by the first address detection unit when data is recorded or reproduced in the first area, and the second address is processed by the second wobble processing unit and is detected by the second address detection unit when data is recorded or reproduced in the second area.

13. A disk manufacturing apparatus comprising:
a control unit to control generation of a first address and a second address on an information recording medium so that a first area disposed in a data recordable area of the information recording medium is distinguished from a second area disposed in the data recordable area, the second area using a recording and/or reproducing unit block having a size that is different from a size of a recording and/or reproducing unit block used in the first area; and
a cutting unit to generate the first address and the second address on the information recording medium under control of the control unit;
wherein a length of the recording and/or reproducing unit block used in the first area is shorter than a circumference of the first area; and
wherein a length of the recording and/or reproducing unit block used in the second area is longer than the circumference of the first area and shorter than a circumference of the second area.

14. The disk manufacturing apparatus of claim 13, wherein the cutting unit comprises a modulation unit comprising:
a first wobble processing unit to process the first address by a first wobble processing methods; and
a second wobble processing unit to process the second address by a second wobble processing method;
wherein the control unit controls the modulation unit so that the first address is processed by the first wobble processing unit when address information is generated in the first area, and the second address is processed by the second wobble processing unit when address information is generated in the second area.

15. The disk manufacturing apparatus of claim 14, wherein a wobble modulation method used by the first wobble processing method is different from a wobble modulation method used by the second wobble processing method.

16. The disk manufacturing apparatus of claim 15, wherein the first wobble processing method uses a binary phase shift key operation (BPSK), and the second wobble processing method uses a frequency shift key operation (FSK).

17. The disk manufacturing apparatus of claim 14, wherein a basic frequency used by the first wobble processing method is different from a basic frequency used by the second wobble processing method.

18. The disk manufacturing apparatus of claim 14, wherein a number of channel clock cycles of a wobble cycle used by the first wobble processing method is different from a number of channel clock cycles of a wobble cycle used by the second wobble processing method.

19. The disk manufacturing apparatus of claim 13, wherein the cutting unit comprises a signal processing unit comprising:

a first address generation unit to generate the first address; and a second address generation unit to generated the second address;

wherein the control unit controls the signal processing unit so that the first address is generated by the first address generation unit when address information is generated in the first area, and the second address is generated by the second address generation unit when address information is generated in the second area.

20. The disk manufacturing apparatus of claim 19, wherein the second address includes an identifier that is not included in the first address.

21. The disk manufacturing apparatus of claim 20, wherein each of the first address and the second address comprises a sync and address data; and wherein the identifier included in the second address is generated by changing repetition times of the sync of the first address, and/or changing an order of the sync of the first address, and/or changing a combination of the sync of the first address, and/or using a predetermined pattern, and/or using a predetermined combination.

22. The disk manufacturing apparatus of claim of 20, wherein each of the first address and the second address comprises a sync and address data; and wherein the identifier included in the second address is inserted into the address data of the second address.

23. The disk manufacturing apparatus of claim 19, wherein a number of bits forming the second address is different from a number of bits forming the first address.

24. The disk manufacturing apparatus of claim of 13, wherein the cutting unit comprises:

a modulation unit comprising:
  a first wobble processing unit to process the first address by a first wobble processing methods; and
  a second wobble processing unit to process the second address by a second wobble processing method; and a signal processing unit comprising:
  a first address generation unit to generate the first wobble processed information to fit a first address format; and
  a second address generation unit to generate the second wobble processed information to fit a second address format;

wherein the control unit controls the modulation unit and the signal processing unit so that the first address is processed by the first wobble processing unit and generated by the first address generation unit when address information is generated in the first area, and the second address is processed by the second wobble processing unit and generated by the second address generation unit when address information is generated in the second area.

25. A recording and/or reproducing method comprising;

recording data on and/or reproducing data from an information recording medium; and signal processing a first address and a second address to distinguish a first area disposed in a data recordable area of the information recording medium from a second area disposed in the data recordable area, the second area using a recording and/or reproducing unit block having a size that is different from a size of a recording and/or reproducing unit block used in the first area;

wherein a length of the recording and/or reproducing unit block used in the first area is shorter than a circumference of the first area; and wherein a length of the recording and/or reproducing unit block used in the second area is longer than the circumference of the first area and shorter than a circumference of the second area.

26. The recording and/or reproducing method of claim 25, wherein the signal processing comprises:

processing the first address by a first wobble processing method when data is recorded or reproduced in the first area; and processing the second address the data is processed by a second wobble processing method when data is recorded or reproduced in the second area.

27. The recording and/or reproducing method of claim 26, wherein a wobble modulation method used by the first wobble processing method is different from a wobble modulation method used by the second wobble processing method.

28. The recording and/or reproducing method of claim 27, wherein the first wobble processing method uses a binary phase shift key operation (BPSK), and the second wobble processing method uses a frequency shift key operation (FSK).

29. The recording and/or reproducing method of claim 26, wherein a basic frequency used by the first wobble processing method is different from a basic frequency used by the second wobble processing method.

30. The recording and/or reproducing method of claim 26, wherein a number of channel clock cycles of a wobble cycle of used by the first wobble processing method is different from a number of channel clock cycles of a wobble cycle used by the second wobble processing method.

31. The recording and/or reproducing method of claim 25, wherein the signal processing comprises:

detecting the first address when data is recorded or reproduced in the first area; and detecting the second address when data is recorded or reproduced in the second area.

32. The recording and/or reproducing method of claim 31, wherein the second address includes an identifier that is not included in the first address.

33. The recording and/or reproducing method of claim 32, wherein each of the first address and the second address comprises a sync and address data; and wherein the identifier included in the second address is generated by changing repetition times of the sync of the first address, and/or changing an order of the sync of the first address, and/or changing a combination of the sync of the first address, and/or using a predetermined pattern, and/or using a predetermined combination.

34. The recording and/or reproducing method of claim 32, wherein each of the first address and the second address comprises a sync and address data; and wherein the identifier included in the second address is inserted into the address data of the second address.

35. The recording and/or reproducing method of claim 31, wherein a number of bits forming the second address is different from a number of bits forming the first address.

36. The recording and/or reproducing method of claim 25, wherein the signal processing comprises:

processing the first address by a first wobble processing method and detecting the first address by a first address detection method when data is recorded or reproduced in the first area; and processing the second address by a second wobble processing method and detecting the second address by a second address detection unit when data is recorded or reproduced in the second area.

37. A disk manufacturing method comprising:
generating a first address and a second address on an information recording medium so that a first area located in a data recordable area of the information recording medium is distinguished from a second area located in the data recordable area, the second area using a recording and/or reproducing unit block having a size that is different from a size of a recording and/or reproducing unit block used in the first area;
wherein a length of the recording and/or reproducing unit block used in the first area is shorter than a circumference of the first area; and
wherein a length of the recording and/or reproducing unit block used in the second area is longer than the circumference of the first area and shorter than a circumference of the second area.

38. The disk manufacturing method of claim 37, wherein the generating comprises:
processing the first address by a first wobble processing method when address information is generated in the first area; and
processing the second address by a second wobble processing method when address information is generated in the second area.

39. The disk manufacturing method of claim 38, wherein a wobble modulation method used by the first wobble processing method is different from a wobble modulation method used by the second wobble processing method.

40. The disk manufacturing method of claim 39, wherein the first wobble processing method uses a binary phase shift key operation (BPSK), and the second wobble processing method uses a frequency shift key operation (FSK).

41. The disk manufacturing method of claim 38, wherein a basic frequency used by the first wobble processing method is different from a basic frequency used by the second wobble processing method.

42. The disk manufacturing method of claim 38, wherein a number of channel clock cycles of a wobble cycle used by the first wobble processing method is different from a number of channel clock cycles of a wobble cycle used by the second wobble processing method.

43. The disk manufacturing method of claim 37, wherein the generating comprises:
generating the first address by a first address generation method when address information is generated in the first area; and
generating the second address by a second address generation method when address information is generated in the second area.

44. The disk manufacturing method of claim 43, wherein the second address includes an identifier that is not included in the first address.

45. The disk manufacturing method of claim 44, wherein each of the first address and the second address comprises a sync and address data; and
wherein the identifier included in the second address is generated by changing repetition times of the sync of the first address, and/or changing an order of the sync of the first address, and/or changing a combination of the sync of the first address, and/or using a predetermined pattern, and/or using a predetermined combination.

46. The disk manufacturing method of claim 44, wherein each of the first address and the second address comprises a sync and address data; and
wherein the identifier included in the second address is inserted into the address data of the second address.

47. The disk manufacturing method of claim 43, wherein a number of bits forming the second address is different from a number of bits forming the first address.

48. The disk manufacturing method of claim 37, wherein the generating comprises:
processing the first address by a first wobble processing method and generating the first address by a first address generation method when address information is generated in the first area; and
processing the second address by a second wobble method and generating the second address by a second address generation method when address information is generated in the second area.

49. An information recording medium comprising:
a first area that is located in a data recordable area of the information recording medium and uses a first address; and
a second area that is located in the data recordable area, the second area using a recording and/or reproducing unit block having a size that is different from a size of a recording and/or reproducing unit block used in the first area, the second area using a second address to distinguish the recording and/or reproducing unit block of the second area from the recording and/or reproducing unit block of the first area;
wherein a length of the recording and/or reproducing unit block used in the first area is shorter than a circumference of the first area; and
wherein a length of the recording and/or reproducing unit block used in the second area is longer than the circumference of the first area and shorter than a circumference of the second area.

50. The information recording medium of claim 49, wherein:
the first address is generated using a wobble modulation method that is different from a wobble modulation method used in generating the second address; or
the first address is generated using a basic frequency that is different from a basic frequency used in generating the second address; or
the first address is generated using a wobble cycle having a number of channel clock cycles that is different from a number of channel clock cycles of a wobble cycle used in generating the second address.

51. The information recording medium of claim 49, wherein the second address includes an identifier that is not included in the first address.

52. The information recording medium of claim 49, wherein a number of bits forming the second address is different from a number of bits forming the first address.

53. An information recording medium comprising:
a plurality of recording and/or reproducing areas located on a circumference of the information recording medium, each recording and/or reproducing area using a particular recording and/or reproducing unit block according to a circumferential length of the recording and/or reproducing area;
wherein to prevent overlapping of any of the recording and/or reproducing unit block having a length that is longer than the circumference of the respective recording and/or reproducing area, a recording and/or reproducing unit block that is used in the overlapping area is different from a recording and/or reproducing unit block that is used in a non-overlapping area.

54. A recording and/or reproducing apparatus to record data on and/or reproduce data from an information recording medium, comprising:
   a signal processing unit to perform signal processing of a plurality of addresses to distinguish a plurality of recording and/or reproducing areas located on the information recording medium from one another, wherein one recording and/or reproducing area of the plurality of recording and/or reproducing areas uses a recording and/or reproducing unit block having a size that is different from a size of a recording and/or reproducing unit block used in another recording and/or reproducing area of the plurality of recording and/or reproducing areas; and
   a control unit to control the signal processing unit to record and/or reproduce data using the plurality of addresses in respective ones of the plurality of recording and/or reproducing areas;
   wherein a length of the recording and/or reproducing unit block used in the other recording and/or reproducing area is shorter than a circumference of the other recording and/or reproducing area; and
   wherein a length of the recording and/or reproducing unit block used in the one recording and/or reproducing area is longer than the circumference of the other recording and/or reproducing area and shorter than a circumference of the one recording and/or reproducing area.

55. A wobble signal processing unit of a disk drive apparatus, comprising:
   a first demodulation unit and a second demodulation unit to demodulate address information of data recorded on an information recording medium; and
   a control unit to control the first demodulation such unit and the second demodulation unit so that the address information of data recorded in a first recording and/or reproducing area of the information recording medium is demodulated by the first demodulation unit, and the address information of data recorded in a second recording and/or reproducing area of the information recording medium is demodulated by the second demodulation unit;
   wherein a length of a recording and/or reproducing unit block used in the first recording and/or reproducing area is shorter than a circumference of the first recording and/or reproducing and
   wherein a length of a recording and/or reproducing unit block used in the second recording and/or reproducing area is longer than the circumference of the first recording and/or reproducing area and shorter than a circumference of the second recording and/or reproducing area.

56. A computer-readable medium encoded with processing instructions to be read by a computer to perform a method comprising:
   generating a first address and a second address on an information recording medium so that a first area located in a data recordable area of the information recording medium is distinguished from a second area disposed in the data recordable area, the second area using a recording and/or reproducing unit block having a size that is different from a size of a recording and/or reproducing unit block used in the first area;
   wherein a length of the recording and/or reproducing unit block used in the first area is shorter than a circumference of the first area; and
   wherein a length of the recording and/or reproducing unit block used in the second area is longer than the circumference of the first area and shorter than a circumference of the second area.

* * * * *

UNITED STATES PATENT AND TRADEMARK OFFICE
CERTIFICATE OF CORRECTION

| | | |
|---|---|---|
| PATENT NO. | : 7,355,950 B2 | Page 1 of 1 |
| APPLICATION NO. | : 10/883976 | |
| DATED | : April 8, 2008 | |
| INVENTOR(S) | : Jin-han Kim et al. | |

It is certified that error appears in the above-identified patent and that said Letters Patent is hereby corrected as shown below:

Column 19, line 36, change "methods" to --method--.

Column 20, line 13, delete "the data is processed".

Column 20, line 32, delete "of".

Column 23, line 35, delete "such".

Column 23, line 10, insert --area;-- after "reproducing".

Signed and Sealed this

First Day of July, 2008

JON W. DUDAS
*Director of the United States Patent and Trademark Office*